(12) United States Patent
Akiyama

(10) Patent No.: US 7,253,543 B2
(45) Date of Patent: Aug. 7, 2007

(54) ELECTRIC BLOWER AND SUPERCHARGER FOR AUTOMOBILES USING THE SAME

(75) Inventor: Uji Akiyama, Yokohama (JP)

(73) Assignee: Samsung Gwanju Electronics Co., Ltd., Gwanju (KR)

( * ) Notice: Subject to any disclaimer, the term of this patent is extended or adjusted under 35 U.S.C. 154(b) by 108 days.

(21) Appl. No.: 11/092,711

(22) Filed: Mar. 30, 2005

(65) Prior Publication Data

US 2005/0285462 A1    Dec. 29, 2005

(30) Foreign Application Priority Data

| Mar. 30, 2004 | (JP) | ................. 2004-129004 |
| Apr. 30, 2004 | (JP) | ................. 2004-162542 |
| Aug. 13, 2004 | (JP) | ................. 2004-261632 |

(51) Int. Cl.
  *H02K 9/00* (2006.01)
  *H02K 11/00* (2006.01)
  *H02K 57/00* (2006.01)

(52) U.S. Cl. .................... 310/63; 310/58; 310/68 B; 310/68 R; 417/423.7

(58) Field of Classification Search ............. 310/68 B; 123/565
See application file for complete search history.

(56) References Cited

U.S. PATENT DOCUMENTS

| 3,749,991 | A |   | 7/1973 | Kuniyoshi |
| 4,088,932 | A | * | 5/1978 | Okuyama et al. ........... 318/138 |
| 5,043,641 | A | * | 8/1991 | Feigel et al. ............... 318/254 |
| 5,638,796 | A | * | 6/1997 | Adams et al. .............. 123/565 |
| 6,222,331 | B1 | * | 4/2001 | Blum ........................ 318/254 |

| 2003/0173850 | A1 | 9/2003 | Beyer et al. |

FOREIGN PATENT DOCUMENTS

| DE | 2 342 718 | 4/1974 |
| EP | 0 458 211 | 11/1991 |
| GB | 2 089 136 | 6/1982 |

(Continued)

OTHER PUBLICATIONS

European Patent Office, Search Report issued Jun. 28, 2006 with respect to European Patent Application No. 05290693.0 filed on Mar. 29, 2005.

(Continued)

*Primary Examiner*—Burton Mullins
(74) *Attorney, Agent, or Firm*—Blank Rome LLP

(57) ABSTRACT

A compact-sized, high-efficient, and high-speed electric blower has high centrifugal resistance. The electric blower includes a rotor that has a multi-slot rotor winding along which an excitation electric current is supplied through a slip ring by a power supply brush, a stator that detects the position of a magnetic pole of the rotor, and has a stator winding in a pole-focused winding pattern, a centrifugal fan attached to a rotational axis of the rotor, and a casing housing the stator and having a path for wind. In response to the rotor pole position detection signal, a semiconductor switch regulates and controls the electric current through the rotor winding or the stator winding. Semiconductor switches control the electric current through the rotor winding or stator winding in accordance with the detection signal regarding the position of rotor magnetic pole.

13 Claims, 9 Drawing Sheets

FOREIGN PATENT DOCUMENTS

| | | | |
|---|---|---|---|
| JP | 57-135665 | * | 8/1982 |
| JP | 04127855 | | 4/1992 |
| JP | 2823817 | | 9/1998 |
| WO | WO 2004/004097 | | 1/2004 |

OTHER PUBLICATIONS

Taiwan Patent Office, Office Action issued Nov. 13, 2006, with respect to Taiwan Patent Application No. 94109543 filed Mar. 28, 2005.

* cited by examiner

ELECTRIC BLOWER AND SUPERCHARGER FOR AUTOMOBILES USING THE SAME

REFERENCE TO RELATED APPLICATIONS

This application claims the benefit of Japanese Patent Application No. 2004-129004 filed Mar. 30, 2004, Japanese Patent Application No. 2004-162542 filed Apr. 30, 2004, and Japanese Patent Application No. 2004-261632 filed Aug. 13, 2004, in the Japan Patent Office, the disclosure of each of which is incorporated herein by reference.

FIELD OF THE INVENTION

The present invention relates to an electric blower of high-speed rotation which is compact and light-weight.

BACKGROUND OF THE INVENTION

Universal motors have widely been used as for high-speed rotation electric blowers. This type of motor has a brush of short lifespan because of wear due to high-speed rotation exceeding 50,000 RPM, high-voltage driving of 200V, or high-capacity operation reaching 2 Kw. Accordingly, a semiconductor-controlled synchronous motor, such as a three-phase brushless DC motor, has recently been made available. The semiconductor-controlled synchronous motor has a relatively longer lifespan. However, because a permanent magnet is used for a rotor, it is apt to be damaged by the centrifugal force during high-speed operation.

Japanese Patent No. 2823817 teaches a permanent magnet embedded motor, in which a magnet is buried in an armature iron core in an attempt to strengthen the rotor. However, the achieved strength is still insufficient.

Conventionally, a three-phase inverter circuit has been used, which uses a Hall IC in detecting rotational position, and a distribution IC as a driving control circuit. A stator iron core is formed with a plurality of slots in its inner circumference for wire distribution, but has a structure which does not allow cool air to easily pass through the gap between the rotor and the stator. Accordingly, the temperature of the stator increases, thereby affecting efficiency. Additionally, a smoothing condenser of rectified voltage is required for the driving control circuit, occupying an unnecessarily large area. The above also has increased costs.

When employed in high-speed rotation, such a synchronous motor has insufficient resistance against centrifugal force due to its structure in which the rotor uses a permanent magnet. Furthermore, because the driving control circuit of the brushless DC motor is complicated, a large space is required for accommodating the circuit which does not meet with the current trend for compact and economic products.

Additionally, because there is almost no cool air flowing in the gap between the stator and the rotor, motor and blowing efficiency deteriorate. If the number of power switching elements is reduced, starter torque deteriorates, and the motor may not start instantly, or may have an abnormality. Superchargers for automobiles particularly have deteriorated efficiency in starting the operation, as the superchargers use backpressure of the engine.

SUMMARY OF THE INVENTION

Accordingly, the present general inventive concept has been made to solve the above-mentioned problem. An aspect of the present general inventive concept is to provide a compact, high-efficiency and high-speed electric blower which has a rotor of an increased resistance against centrifugal force and also has improved cooling. It also provides an electric supercharger for use in automobiles which uses the above electric blower.

Additionally, it is another inventive concept of the present invention to provide a semiconductor-controlled electric blower which requires less space for a control circuit and has a reduced price, but also provides improved operation start characteristics.

The above-mentioned aspects and/or other features of the present invention can be achieved by providing an electric blower, which includes a rotor having a multi-slot rotor winding along which an excitation electric current is supplied through a slip ring by a power supply brush, a stator having a detecting means for detecting the position of a magnetic pole of the rotor, and a stator winding in a pole-focused winding pattern, a casing housing the stator and forming a main path for wind, and a centrifugal fan attached to a rotational axis of the rotor, wherein, in response to the rotor pole position detection signal, a semiconductor switch regulates, and therefore controls the electric current through the rotor winding or the stator winding.

The rotor can have a rotor iron core having a plurality of slots, and a wire wound around the rotor iron core in a overlaid pattern such that the winding on the rotor iron core is excited to form a magnet.

The stator can have magnetic poles such that a distance between a first magnetic end section and the rotor is shorter than a second magnetic pole. The stator also can have two stator poles and signal-phase stator winding. The rotor winding alone is excited for a predetermined time and then the stator winding is controlled.

The stator can have four poles and two pairs of stator windings so that adjacent poles can have the same polarity, and two semiconductor switches control the stator winding.

The stator can have three or six stator poles, and three semiconductor switches that control the three-phase stator winding.

According to another aspect of the present invention, an electronic supercharger for use in automobiles, which uses the electric blower as described above, is provided.

Accordingly, a rotor of an electric blower has a DC flowing through a rotor winding thereof, through the slip ring, power supply, and receive brushes. The rotor is structured robust against the centrifugal force due to high speed rotation, and at the same time, the rotor iron core has a plurality of slots in an identical shape such that wire can be wound thereon in an overlaid pattern. Because excellent rotor balance is provided, and robustness to centrifugal force improves, a more fast rotating and high-capacity product can be provided.

With the present invention, a rotor winding is structured such that excitation electric current is fed through a slip ring. Therefore, a strong rotational body with high robustness against centrifugal force can be provided, and an electric blower, which is easy to correct any unbalance and capable of fast operation, can be provided.

Furthermore, with improved air ventilation and cooling effect of the stator, the diameter of the semiconductor at the winding can be decreased, and the weight of copper can also be decreased. As a result, efficiency is increased. Additionally, because detecting means is installed to detect the position of the rotor poles, and semiconductor switches control the electric current flowing through the stator winding or the rotor winding in accordance with the position detection signal outputted from the detecting means, the wear of the brushes, as is found in universal motors, does not occur. At the same time, the lifespan of the electric blower can be increased without having to increase the capacity of the motor.

According to one aspect of the present invention, a rotor iron core has slots of the same pitch, and wire is wound thereon in an overlaid pattern. Accordingly, the rotor has excellent balance in rotational movement, and even if an unbalance occurs, such unbalance can be reduced. Additionally, tension of the winding itself also helps to increase resistance to centrifugal force.

Additionally, the rotor is structured so that the stationed position in which the rotor winding alone is excited, and the central position of magnetic attraction force in which the stator winding is excited, vary from each other. As a result, the number of semiconductor switches can be minimized, and a more economic price can be provided.

Furthermore, a moving magnetic field can be created during start-up. Therefore, even when the frictional load increases during the start-up, normal rotational speed can be reached within a short time.

Furthermore, because three semiconductor switches control the three-phase stator winding, a rotational magnetic field can be created during start-up, and a compact-sized control circuit can achieve normal rotational speed within a short time.

Furthermore, when applied in a supercharger for an automobile, the electric blower can increase efficiency during engine start-up, and also improve acceleration characteristics of an automobile.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
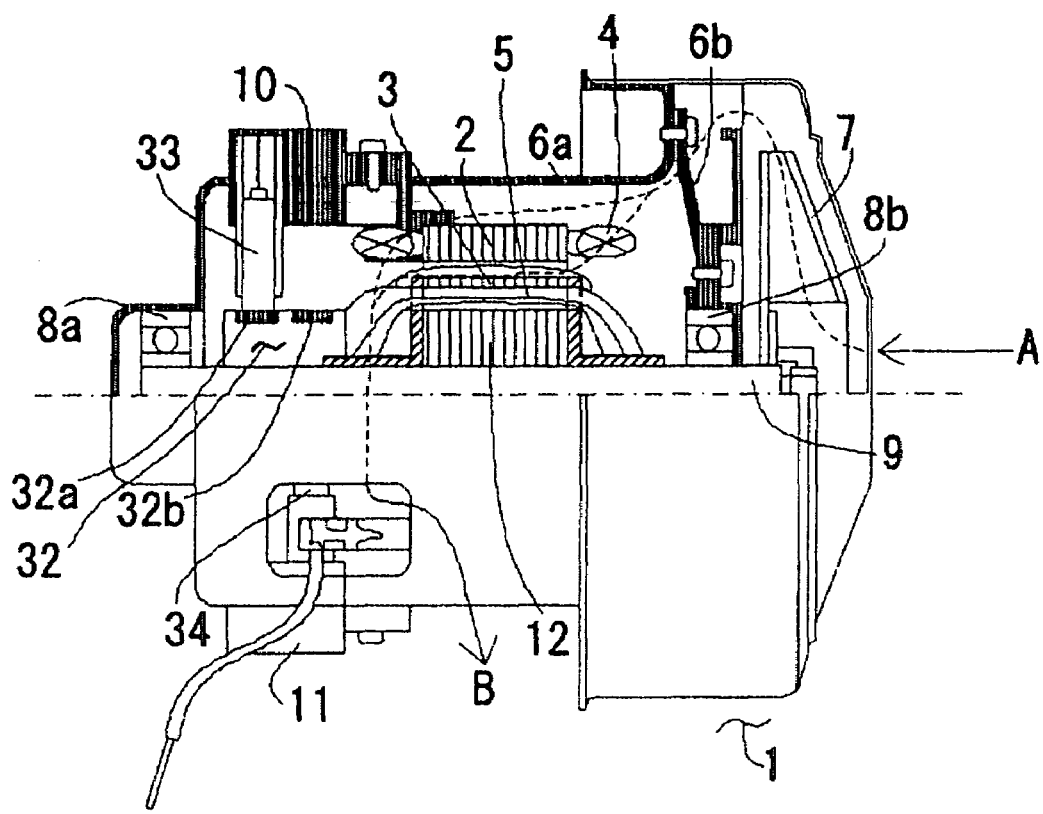
FIG. 1 is a longitudinal sectional view of a first embodiment of the present invention.

Certain embodiments of the present invention will be described in greater detail with reference to the accompanying drawings.

In the following description, the same drawing reference numerals are used for the same elements even in different drawings. The matters defined in the description, such as detailed construction and elements, are only provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
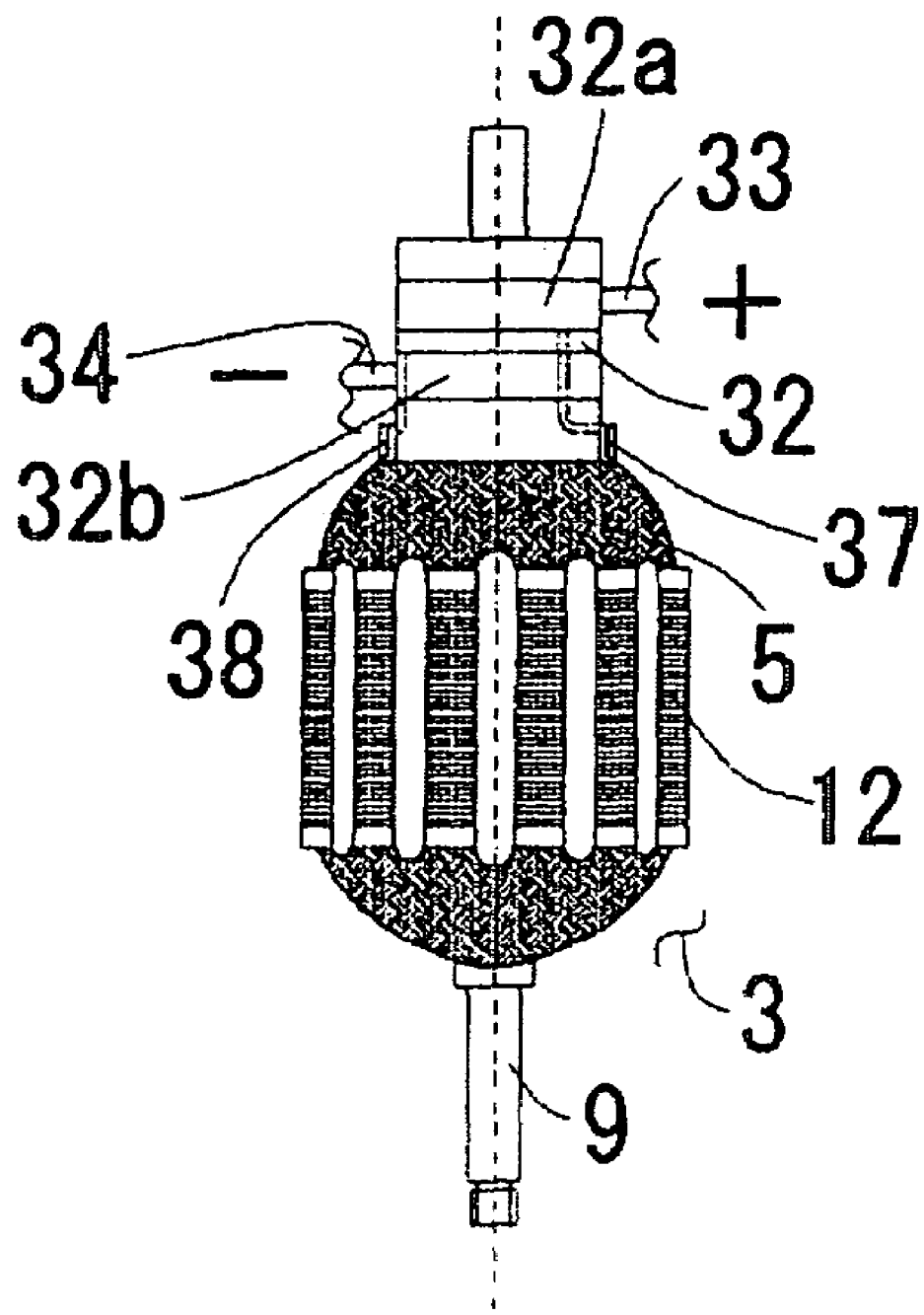
FIG. 2 is a side view of a rotor of the first embodiment.
Figure 3A:
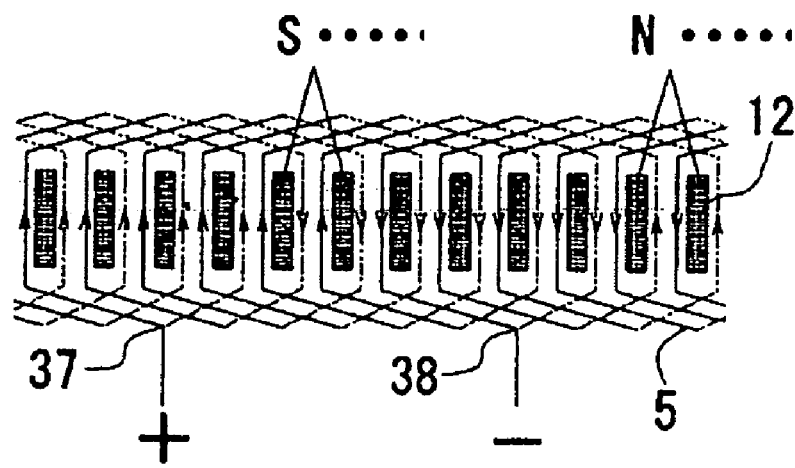
FIGS. 3A and 3B are diagrammatical views of a rotor winding according to one example of the first embodiment of the present invention.
Figure 3B:
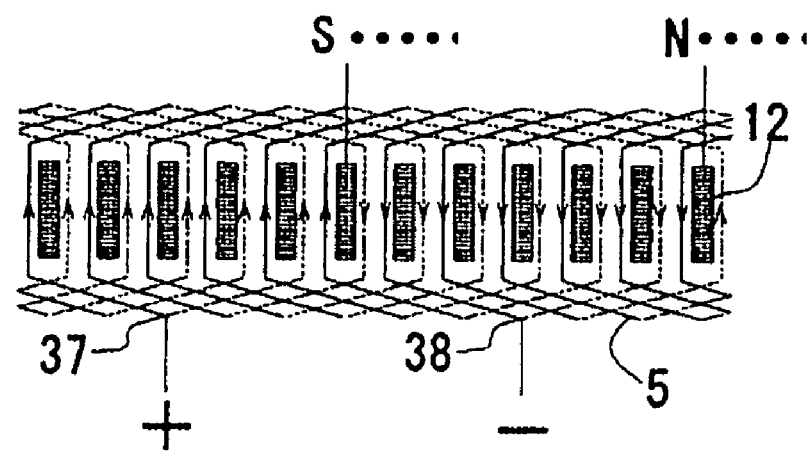
Figure 4:
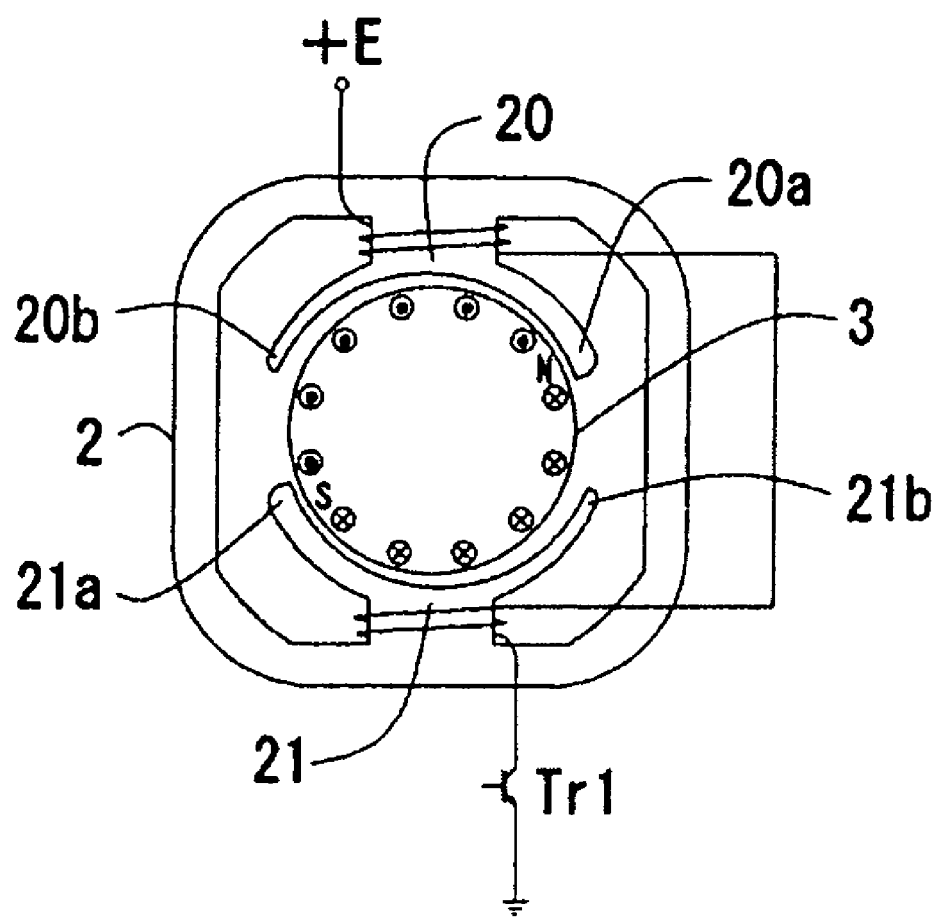
FIG. 4 is a plan view illustrating the structure of the magnetic poles of the rotor and the stator according to the first embodiment of the present invention.

The first embodiment will now be described. FIG. 1 shows the longitudinal section of an electric blower according to the first embodiment of the present invention. FIG. 2 is a side view of a rotor of the first embodiment. FIGS. 3A and 3B illustrate a rotor winding according to one example of the first embodiment of the present invention. FIG. 4 illustrates the structure of the magnetic poles of the rotor and the stator according to the first embodiment of the present invention.

Referring to FIG. 1, a stator 2 is received in a cylindrical casing 6a. A rotor 3 is received in the stator 2, and opposite ends of a rotary shaft 9 are movably supported on bearings 8a and 8b attached at the center part of the casings 6a and 6b so as to freely rotate. A centrifugal blower 7 is attached to a leading end of the rotary shaft 9, with a path for wind being created between points A and B, substantially in the direction indicated by the arrows of FIG. 1. A slip ring 32 having a plus ring 32a and a minus ring 32b is disposed on the rotor 3. A plus brush 33 is in contact with the plus slip ring 32a by a plus brush holder 10, while a minus brush 34 is in contact with the minus slip ring 32b by a minus brush holder 11.

As shown in FIG. 2, the rotor 3 includes an iron core 12 with a plurality of slots, wiring 5, the slip ring 32 including plus and minus slip rings 32a and 32b, and is attached to the rotary shaft 9. A plus tungsten 37 comes out of the plus slip ring 32a, while a minus tungsten 38 comes out of the minus slip ring 32b. FIGS. 3A and 3B illustrate one embodiment of the position of the coils for the purpose of clear understanding. However, one will appreciate that the number of coils at the center of the magnetic poles may be reduced to secure a wider cooling passage and to reduce loss of heat. FIG. 3A shows each width of N and S poles being formed wide enough to cover two slots of the core 12, and FIG. 3B shows each width of N and S poles being focused to cover one slot only. Phantom arrows indicate the direction of the electric current. As shown, each width of N and S poles can be varied freely, by varying the direction of winding as necessary.

As shown in FIG. 4, the stator 2 has a two-pole magnetic field structure with focused winding, in which sufficient cool air passages are formed between the stator 2 and the cylindrical casing 6a, and between the stator 2 and the rotor. Each of magnetic poles 20 and 21 is provided with narrow magnetic pole ends 20a and 21a and wide magnetic pole ends 20b and 21b. Although not shown in detail, the rotor 3 is in an excited state by the excitation current such that N and S poles are generated around the rotor 3.

The rotation of the electric blower according to an embodiment of the present invention will now be described below with reference to FIGS. 5A-5C.

Figure 5A:
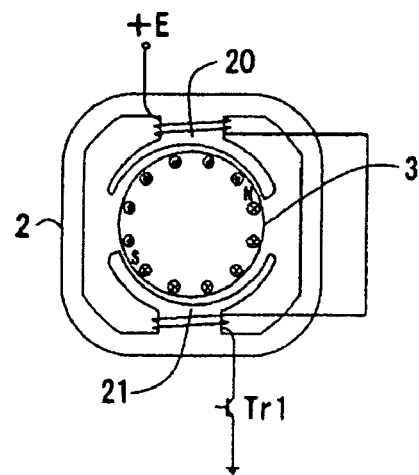
FIGS. 5A, 5B and 5C are plan views illustrating the principle of the rotation of the electric blower according to the first embodiment of the present invention.
Figure 5B:
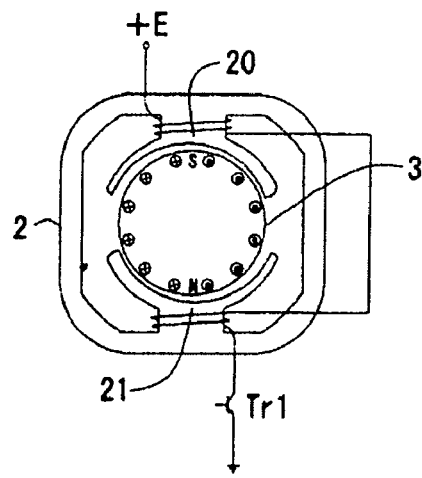
Figure 5C:
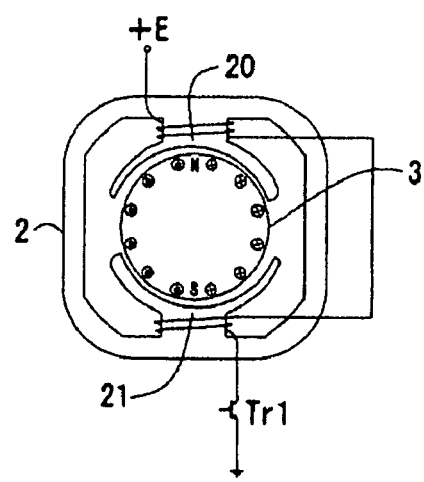

As shown in FIG. 5A, the semiconductor switch Tr1 is in the off state such that a certain electric current is supplied to the rotor 3 through the slip ring 32. The magnetic poles of the rotor 3 stop at a narrow gap with respect to the magnetic poles 20 and 21 of the stator 2, respectively, and also at a position where N and S are altered. Although not shown, the position of the magnetic poles of the rotor 3 may be detected by known means such as a Hall IC, a magnetic resistance element, and a proximity switch using high frequency signal. When it is detected that the rotor magnetic poles reach the position as shown in FIG. 5A, the semiconductor switch Tr1 is turned into the on state.

Accordingly, the magnetic pole 20 is excited to N pole, while the other magnetic pole 21 is excited to S pole. The rotor 3 generates rotational force in the clockwise direction. As the rotor 3 rotates to the position as shown in FIG. 5B, the semiconductor switch Tr1 turns into the off state. The rotor 3 keeps rotating in the clockwise direction due to inertia, and as the rotor 3 passes by the state as shown in FIG. 5C, the semiconductor switch Tr1 is turned on again, and in this manner, the rotor 3 is continuously rotated by the control in every half cycle of the semiconductor switch Tr1.

Instead of single-phase winding, as an alternative example, the stator magnetic poles 20 and 21 may have wires of different phases which are wound by bi-piling in different directions such that the rotor 3 is continuously rotated by controlling both magnetic poles of the two-phase coil in turn. More specifically, the rotor 3 can be continuously rotated by a simple control in which the winding of the rotor 3 alone is excited to place the magnetic poles of the rotor 3 in a stable position, and the two-phase coil is alternately turned on and off. An advantage of this is that there is no need to employ a means for detecting the position of the rotor magnetic poles. Because no permanent magnet is employed in the rotor 3, magnetism does not decrease when a larger starting current flows. Additionally, a soft start circuit can be provided at an economical price, and efficient starting operation can be guaranteed.

Figure 6:
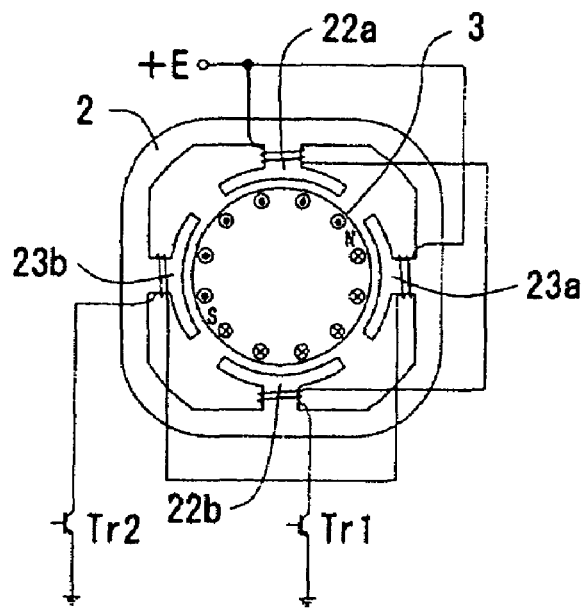
FIG. 6 is a plan view of the rotor and the stator according to a second embodiment of the present invention.

The second embodiment of the present invention will now be described below, with reference to the windings of the rotor and the stator, as illustrated in FIG. 6, and also to FIGS. 7A, 7B, 7C and 7D which are provided for the explanation of the principle of rotation.

As shown in FIGS. 6 and 7A, 7B, 7C and 7D, the rotor 3 has magnetic poles N and S formed by the excitation of overlaid winding which is shown in FIGS. 3A and 3B. The excitation of the electromagnetic winding is carried out by a current flow through the slip ring 32 and plus and minus brushes in parallel connection with the stator winding 4. Direction of the electric current is indicated in section by symbol. However, the method of excitation is not limited to the parallel connection with the stator winding 4. Accordingly, the excitation can be carried out by serial connection, simultaneously with the switching of Tr1 or Tr2.

The stator 2 has two pairs of magnetic poles 22a and 22b, and 23a and 23b, and a pole-focused winding which is connected in series with semiconductor switches Tr1 and Tr2, respectively. The winding 4 is wrapped in a manner such that when the semiconductor switch Tr1 is in the on state, the stator pole 22a turns to the N pole and another stator pole 22b turns to the S pole. The winding 4 is also wrapped in a manner such that when the semiconductor switch Tr2 is in the on state, the stator pole 23a turns to the N pole and another stator pole 23b turns to the S pole.

Figure 7A:
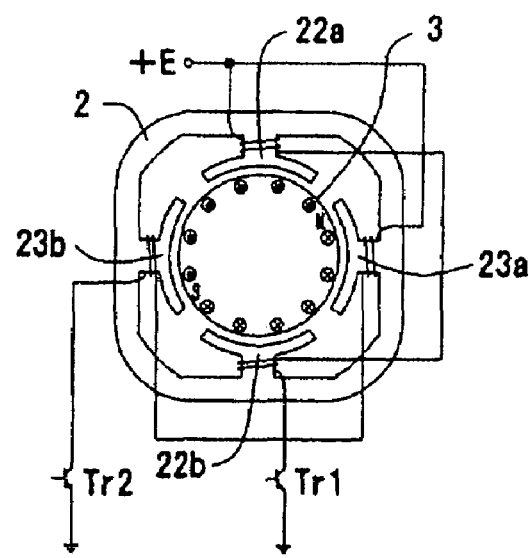
FIGS. 7A, 7B, 7C and 7D are plan views illustrating the principle of the rotation according to the second embodiment of the present invention.
Figure 7B:
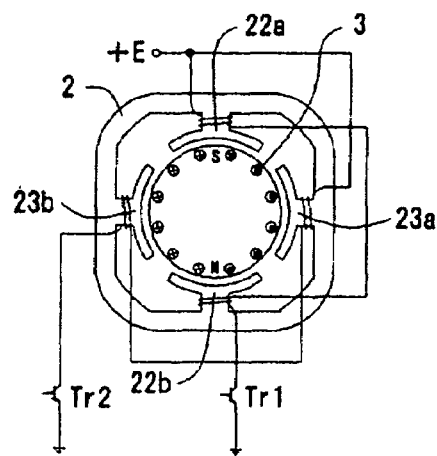
Figure 7C:
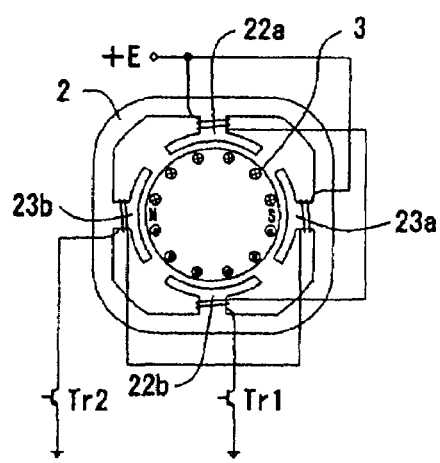
Figure 7D:
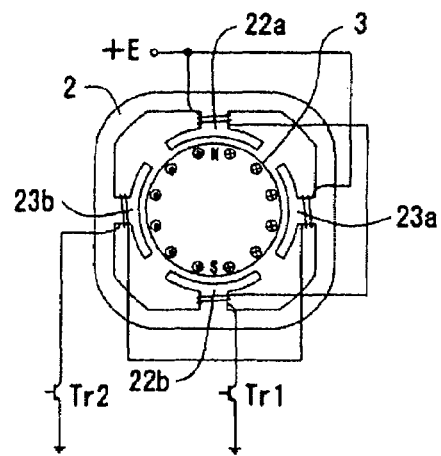

The principle of rotation will now be described with reference to FIGS. 7A, 7B, 7C and 7D. FIG. 7A illustrates the rotor pole in a certain position. With the start-up, the position of pole changes to another position. When this change of position is detected by only one known rotor pole position detecting means, such as a Hall IC, torque may be too high for the start-up. Now, by turning on the semiconductor switch Tr1 from the state as shown in FIG. 7A, the rotor 3 can be rotated clockwise. If the rotor 3 is in position beyond 90° forward of the magnetic field as shown in FIG. 7B, the rotor 3 reverses, but in any event, both switches Tr1 and Tr2 are turned into the on state. If only switch Tr2 is in the on state, the stator pole generates a moving magnetic field which has a peak point that moves in clockwise direction. The rotor 3 is drawn to the moving magnetic field, and therefore starts rotating in a clockwise direction and reaches the position where a position signal is created by the position detecting means.

When the rotor 3 reaches 90° forward of the magnetic field of FIG. 7B, due to the magnetic field position detecting signal, both switches Tr1 and Tr2 are turned on concurrently, and therefore, clockwise torque is generated. A maximum accelerating torque is generated when the rotor 3 is moved to approximately 45° forward of the position shown in FIG. 7B, and a clockwise accelerating torque is applied to the rotor 3 up to 45° forward of the position shown in FIG. 7C. Counterclockwise torque is applied when the rotor 3 is passed the position 45° forward of the position shown in FIG. 7C, and therefore, both switches Tr1 and Tr2 are turned to the on state. The rotor 3 is rotated from the position of FIG. 7D to the position of FIG. 7A by the inertia of the rotor 3 and the loads. When the rotor 3 is passing the position of FIG. 7A, both Tr1 and Tr2 are again turned into the on state for acceleration. By the acceleration and coasting in every half cycle, the number of semiconductor switches can be reduced by a half, and a control circuit can be provided at a cheaper price and with more compactness.

Figure 8:
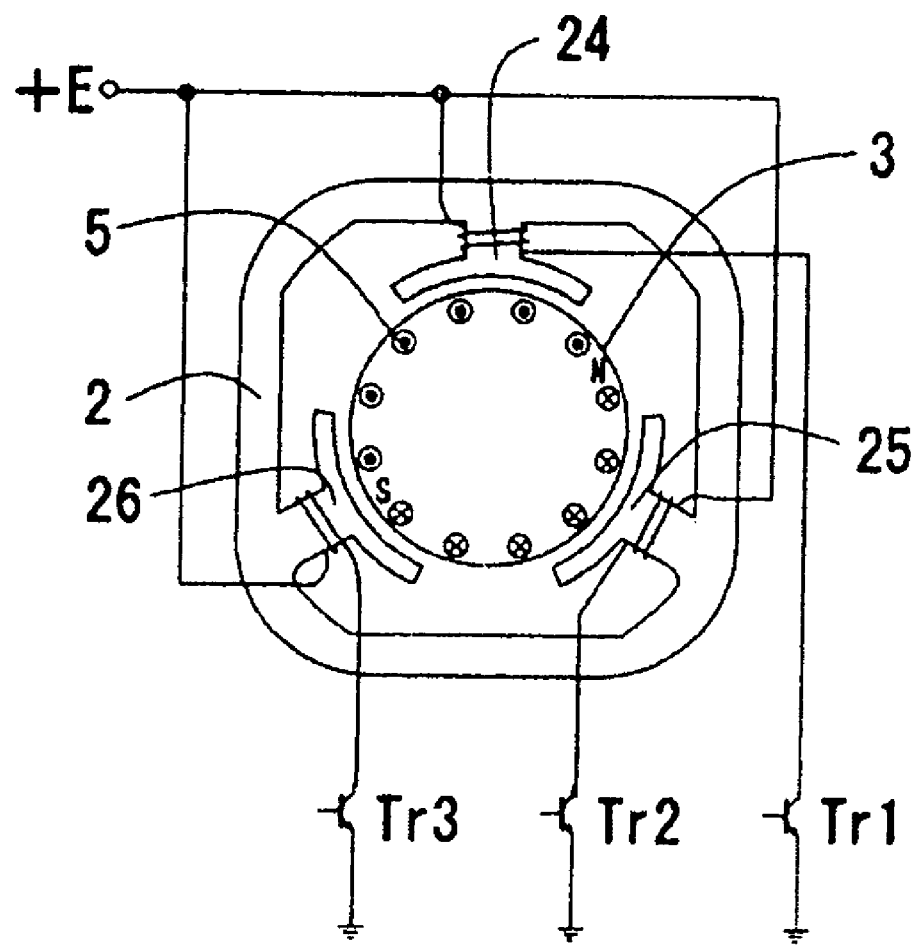
FIG. 8 is a plan view of the rotor and the stator according to a third embodiment of the present invention.

A third embodiment of the present invention will now be explained with reference to FIG. 8 which shows the winding pattern of the rotor and the stator, and FIGS. 9A, 9B and 9C which show the principle of rotation.

As shown, a rotor 3 is formed with an electric current of a certain direction which is generated due to the excitation of the rotor winding 5 in an overlaid winding pattern, as mentioned above. The rotor 3 also has N and S magnetic poles. Three magnetic poles 24, 25, 26 are disposed on the stator 2, and uni-polar 3-phase winding is respectively performed on each of the magnetic poles 24, 25, 26. Each of the magnetic poles 24, 25, 26 is connected with semiconductor switches Tr1, Tr2, Tr3.

The principle of rotation will now be described with reference to FIGS. 9A, 9B, and 9C. Although the rotor may be positioned in any place when the start-up is performed, it will be assumed in the following description that the rotor is in the position as shown in FIG. 9A.

Figure 9A:
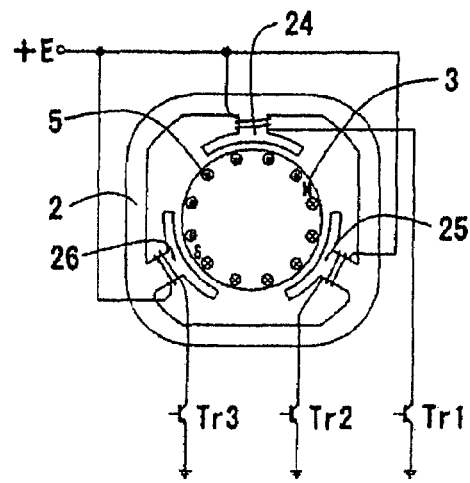
FIGS. 9A, 9B and 9C are plan views illustrating the principle of the rotation according to the third embodiment of the present invention.
Figure 9B:
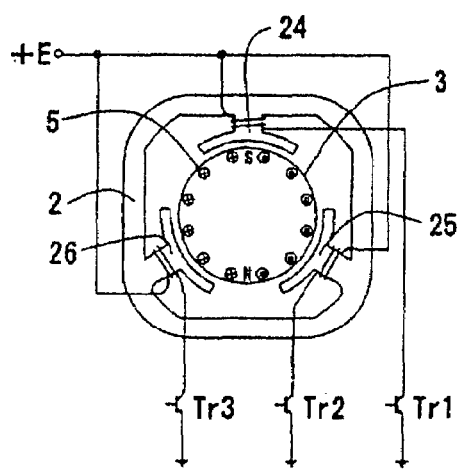
Figure 9C:
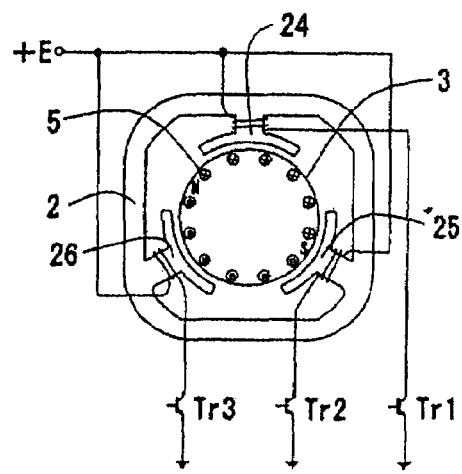

Accordingly, with the rotor 3 in position as shown in FIG. 9A, turning on of switch Tr1 causes the stator electrode 24 to turn to the N pole, while turning the other stator poles 25 and 26 to the S pole. Accordingly, the rotor 3 generates clockwise torque, and accelerates toward the balance point, as shown in FIG. 9B. When the rotor 3 moves near the position as shown in FIG. 9B, the first semiconductor switch Tr1 is turned on, turning on the second semiconductor switch Tr2, and therefore, the stator pole 25 turns to the N pole, while the other stator poles 24 and 26 are turned to the S pole. As a result, the rotor 3 keeps generating clockwise torque, and accelerating toward the balance point, as shown in FIG. 9C. When the rotor 3 moves near to the position as shown in FIG. 9C, the second semiconductor switch Tr2 is turned on, turning on the third semiconductor switch Tr3, and therefore, the stator pole 26 turns to the N pole, while the other stator poles 24 and 25 turn to the S pole. Accordingly, the rotor 3 keeps accelerating toward the balance point, as shown in FIG. 9A.

By disposing three-phase uni-polar windings on the three stator poles of focused winding pattern, and exciting each winding in turn, a magnetic field for rotation is provided to enable the peak point of the magnetic field of the stator poles in one direction. Therefore, the rotor is able to start up in synch with the direction of rotation upon start-up, and can provide a high start-up torque. Although FIG. 8 shows three magnetic poles for illustration purpose, the number of stator poles may vary while providing the same effect, as described above. For example, three pairs of stator poles, that is, 6 magnetic poles may be provided for the stator 2, with doubling of the rotor poles to 4 stator poles.

One example of the present invention may be greatly effective when applied in a supercharger for the start-up of an automobile. Conventional superchargers use back pressure, or a DC device. With the DC device, up to 10,000 rpm of rotation is possible. With the electric blower according to one example of the present invention, up to 100,0000 rpm of rotation is enabled, and a supercharger, which is capable of achieving improved power efficiency at a compact size, can be realized. Additionally, the blower, according to one example of the present invention, is efficient not only for the blower function, but also for other applications. For example, wings of the blower can be used for cooling, and using the advantage of compactness, the blower can be used in combination with reduction gear for use in transportation vehicles, such as automobiles, motorcycles, go-carts, medical vehicles including wheelchairs or stretchers.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An electric blower comprising:
   a rotor having a multi-slot rotor winding along which an excitation electric current is supplied through a slip ring by a power supply brush;
   a stator having a detecting means for detecting the position of a magnetic pole of the rotor, and a stator winding in a pole-focused winding pattern, the stator having magnetic poles such that a distance between a first magnetic end section and the rotor is shorter than a second magnetic pole, the stator having two stator poles and a single phase stator winding, and the rotor winding alone is excited for a predetermined time and then the stator winding is controlled;
   a centrifugal fan attached to a rotational axis of the rotor; and
   a casing housing the stator and having a path for wind, whereby in response to the rotor pole position detection signal detected by the detecting means, a semiconductor switch regulates and controls the electric current through the rotor winding or the stator winding.

2. The electric blower of claim 1, wherein the stator comprises four poles and two pairs of stator windings so that adjacent poles can have the same polarity, and two semiconductor switches control the stator winding.

3. The electric blower of claim 1, wherein the stator comprises a three stator poles, and three semiconductor switches control three-phase stator winding.

4. The electric blower of claim 1, wherein the stator comprises six stator poles, and a three semiconductor switches control three-phase stator winding.

5. The electric blower of claim 1, wherein the rotor has a rotor iron core having a plurality of slots, and a wire wound around the rotor iron core in a overlaid pattern such that the winding on the rotor iron core is excited to form a magnet.

6. An electronic supercharger for use in automobiles, comprising:
   a electric blower including,
   a rotor having a multi-slot rotor winding along which an excitation electric current is supplied through a slip ring by a power supply brush;
   a stator having a detecting means for detecting the position of a magnetic pole of the rotor, and a stator winding in a pole-focused winding pattern, the stator haviun magnetic poles such that a distance between a first magnetic end section and the rotor is shorter than a second magnetic pole, the stator having two stator poles and a stator winding, and the rotor winding alone is excited for a predetermined time and then the stator winding is controlled;
   a centrifugal fan attached to a rotational axis of the rotor; and
   a casing housing the stator and having a path for wind, whereby, in response to the rotor pole position detection signal detected by the detection means, a semiconductor switch regulates controls the electric current through the rotor winding or the stator winding.

7. The electronic supercharger of claim 6, wherein the rotor has a rotor iron core having a plurality of slots, and a wire wound around the rotor iron core in a overlaid pattern such that the winding on the rotor iron core is excited to form a magnet.

8. An electric blower comprising:
   a rotor having a multi-slot rotor winding along which an excitation electric current is supplied through a slip ring by a power supply brush, the rotor having a rotor iron core having a plurality of slots, and a wire wound around the rotor iron core in a overlaid pattern such that the winding on the rotor iron core is excited to form a magnet;
   a stator having a detecting means for detecting the position of a magnetic pole of the rotor, and a stator winding in a pole-focused winding pattern, the stator having magnetic poles such that a distance between a first magnetic end section and the rotor is shorter than a second magnetic pole, the stator having two stator poles and a stator winding, and the rotor winding alone is excited for a predetermined time and then the stator winding is controlled;
   a centrifugal fan attached to a rotational axis of the rotor; and
   a casing housing the stator and forming a main path of wind, whereby, in response to the rotor pole position detection signal detected by the detection means, a semiconductor switch regulates and controls the electric current on the rotor winding or the stator winding.

9. The electric blower of claim 8, wherein the stator comprises four poles and two pairs of stator windings so that adjacent poles can have the same polarity, and two semiconductor switches control the stator winding.

10. The electric blower of claim 8, wherein the stator comprises a three stator poles, and three semiconductor switches control three-phase stator winding.

11. The electric blower of claim 8, wherein the stator comprises six stator poles, and a three semiconductor switches control three-phase stator winding.

12. An electric blower comprising:
   a rotor having a multi-slot rotor winding along which an excitation electric current is supplied through a slip ring by a power supply brush;
   a stator having a detecting means for detecting the position of a magnetic pole of the rotor, and a stator winding in a pole-focused winding pattern, wherein the stator comprises four poles and two pairs of the stator winding so that adjacent poles can have the same polarity, and two semiconductor switches control the stator winding;

a centrifugal fan attached to a rotational axis of the rotor; and a casing housing the stator and having a path for wind, whereby in response to the rotor pole position detection signal detected by the detecting means, a semiconductor switch regulates and controls the electric current through the rotor winding or the stator winding.

13. An electric blower comprising:

a rotor having a multi-slot rotor winding along which an excitation electric current is supplied through a slip ring by a power supply brush, the rotor having a rotor iron core having a plurality of slots, and a wire wound around the rotor iron core in a overlaid pattern such that the winding on the rotor iron core is excited to form a magnet;

a stator having a detecting means for detecting the position of a magnetic pole of the rotor, and a stator winding in a pole-focused winding pattern, wherein the stator comprises four poles and two pairs of the stator winding so that adjacent poles can have the same polarity, and two semiconductor switches control the stator winding;

a centrifugal fan attached to a rotational axis of the rotor; and a casing housing the stator and forming a main path of wind, whereby, in response to the rotor pole position detection signal detected by the detection means, a semiconductor switch regulates and controls the electric current on the rotor winding or the stator winding.

\* \* \* \* \*